United States Patent [19]

Voss et al.

[11] Patent Number: 4,834,642
[45] Date of Patent: May 30, 1989

[54] STRETCHING AND BLOW-MOLDING APPARATUS INCORPORATING A MOLD-LOCKING DEVICE

[75] Inventors: Hermann Voss, Seevetal; Manfred Mank, Hamburg, both of Fed. Rep. of Germany

[73] Assignee: Hermann Berstorff Maschinenbau GmbH, Hanover, Fed. Rep. of Germany

[21] Appl. No.: 248,130

[22] Filed: Sep. 23, 1988

[30] Foreign Application Priority Data

Sep. 25, 1987 [DE] Fed. Rep. of Germany ....... 3732342

[51] Int. Cl.[4] .............................................. B29C 49/56
[52] U.S. Cl. .................................... 425/529; 264/532; 425/450.1; 425/451.9; 425/541
[58] Field of Search ................ 425/529, 534, 539–541, 425/450.1, 451.9; 264/532, 534, 535, 538, 542, 543

[56] References Cited

U.S. PATENT DOCUMENTS

| 2,715,751 | 8/1955 | Weber | 264/538 X |
| 2,834,154 | 5/1958 | Koob | 425/541 X |
| 3,067,598 | 12/1962 | Schirm | 425/451.9 X |
| 3,596,315 | 8/1971 | Yoshikawa et al. | 425/539 X |
| 3,599,280 | 8/1971 | Rosenkranz et al. | 425/541 X |
| 3,685,943 | 8/1972 | Fischer | 425/541 X |
| 3,761,212 | 9/1973 | Kontz | 425/541 X |
| 3,825,396 | 7/1974 | Kontz | 425/541 |
| 4,036,925 | 7/1977 | Kauffman et al. | 264/535 X |
| 4,140,468 | 2/1979 | Duga | 425/534 |
| 4,579,519 | 4/1986 | Maser et al. | 425/541 |

FOREIGN PATENT DOCUMENTS

3336071C2 10/1985 Fed. Rep. of Germany.

Primary Examiner—Richard L. Chiesa
Attorney, Agent, or Firm—Foley & Lardner, Schwartz, Jeffery, Schwaab, Mack, Blumenthal & Evans

[57] ABSTRACT

A stretching and blow-molding apparatus for producing hollow bodies from thermoplastic plastics material comprises a rotatable blow wheel assembly on which a number of molds are mounted. Each mold comprises two mold halves mounted on a common pivot. The apparatus includes a locking device which has a frame-like configuration and comprises a continuous shaft which passes through a set of aligned bores formed in pawls provided on the external surface of one mold half and a locking member which comprises a plurality of locking sections disposed in aligned bores formed in pawls provided on both mold halves, which pawls are interdigitated in the locked position. The uppermost and lowermost locking sections are connected to the continuous shaft. Vertical movement of the continuous shaft or of the locking section causing corresponding vertical movement of the other. The individual locking sections have a length corresponding to the length of the bore in each pawl and end-abut one another. By raising or lowering the frame by a few centimeters so to move each individual locking member from a position in which it is totally located in a single bore to a bridging position in which it is disposed in the bores formed in two adjacent, interdigitated pawls formed on different mold halves, locking over the entire length of the mold joint can be achieved.

6 Claims, 3 Drawing Sheets

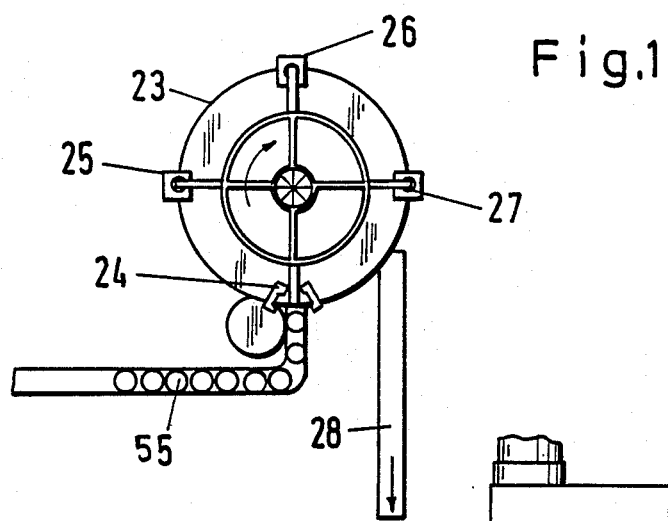
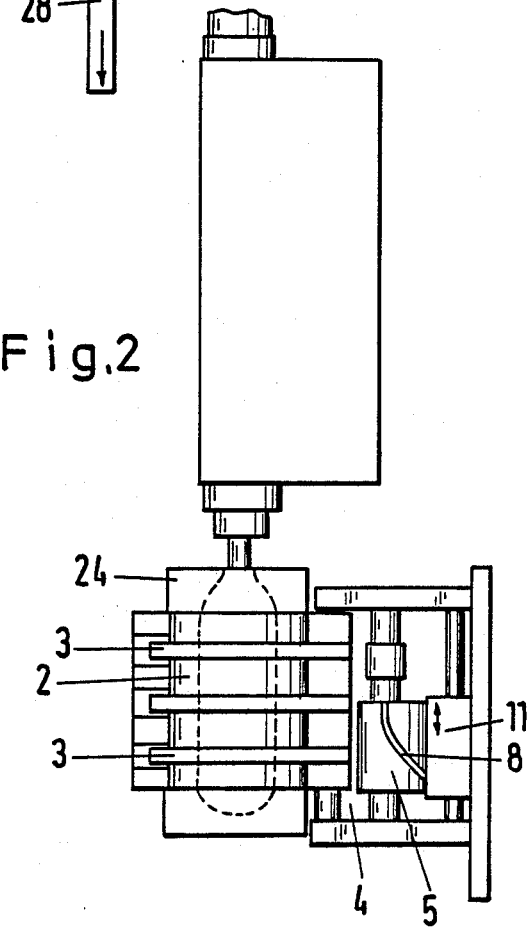

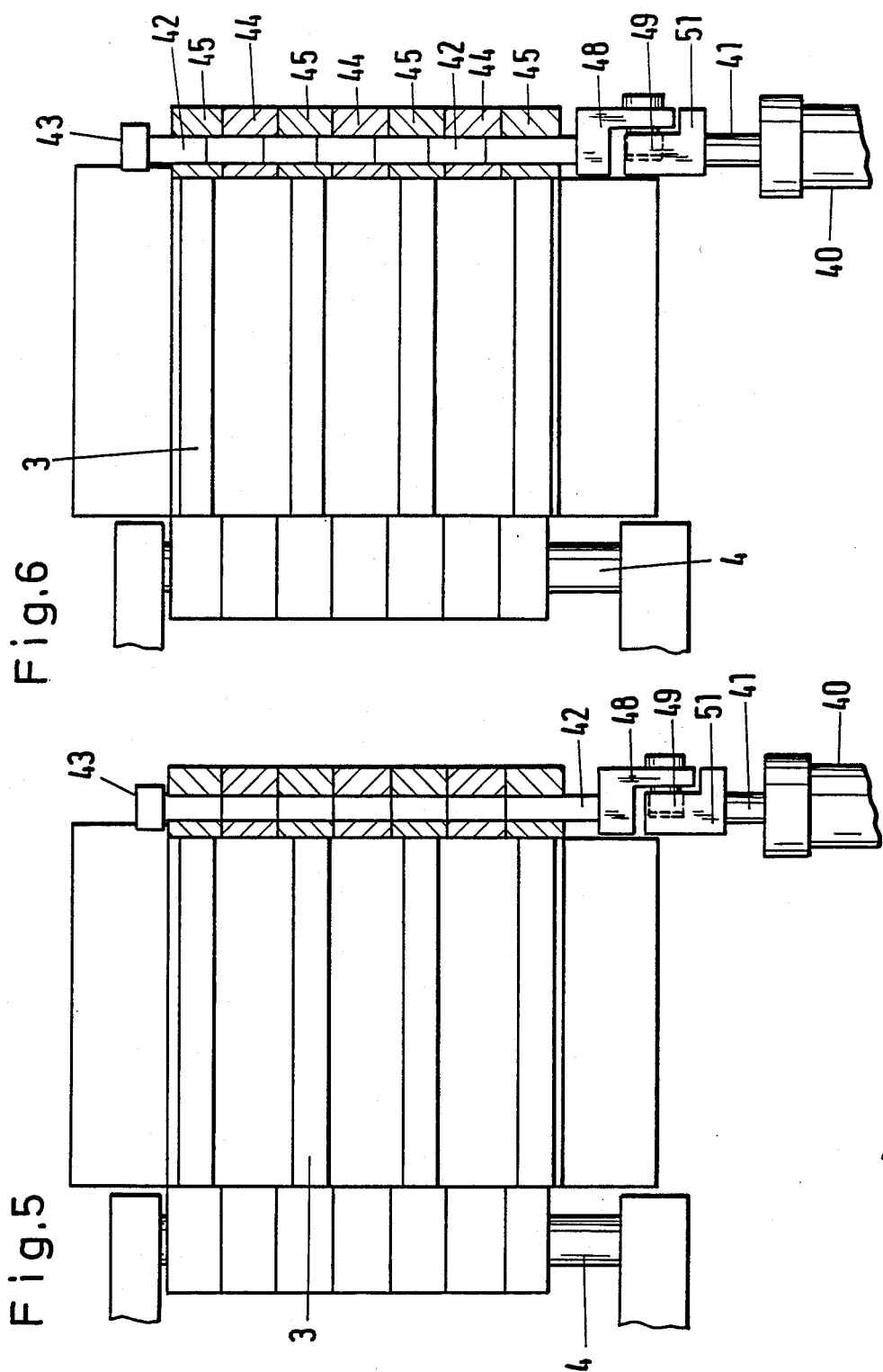

STRETCHING AND BLOW-MOLDING APPARATUS INCORPORATING A MOLD-LOCKING DEVICE

FIELD OF THE INVENTION

The present invention relates to a stretching and blow-molding apparatus incorporating a mold-locking device. More particularly, the present invention relates to a stretching and blow-molding apparatus which is used for producing hollow bodies from thermoplastic plastics materials.

BACKGROUND OF THE INVENTION AND PRIOR ART DISCUSSION

A stretching and blow-molding apparatus for producing hollow bodies from thermoplastic plastics materials is known. Such an apparatus comprises a rotatable wheel assembly on which a plurality of blow molds are mounted. The two halves of each mold are mounted on a common pivot axis to allow the mold to be opened and closed. The apparatus further includes locking claws or pawls which are disposed on the curved external surface of each mold half. These claws or pawls extend beyond the mold centre-line when the mold is closed and interdigitate with one another. Longitudinally displaceable locking members are provided for locking the pawls or claws together. A locking device for use is a stretching and blow-molding apparatus is disclosed in German Patent Specification No. 3336071. However, such device only permits the mold halves to be locked together at two points. Moreover, such a locking device necessitates the use of long lever rods which need to be actuated by a cam system and by a sliding cam controller.

OBJECT OF THE INVENTION

The present invention seeks to provide a stretching and blow-molding apparatus incorporating a mold-locking device which is very simple to manufacture, requires relatively little space and which permits locking to be effected over the entire length of the mold joint. Despite the length of the mold joint, the present invention seeks to provide an arrangement in which the locking and unlocking of the mold halves can be effected very rapidly.

SUMMARY OF THE INVENTION

According to the present invention, there is provided a stretching and blowing apparatus for producing a hollow body from thermoplastic plastics material comprising a rotatable blow wheel assembly, a plurality of blow molds mounted on said wheel assembly, each said mold comprising first and second mold halves, common pivot means mounting both mold halves of each said mold to permit said mold halves to be pivoted into an open position and a closed position and locking means for locking said mold halves together in said closed position wherein said locking means comprises a plurality of pawl members formed on the external surface of each said mold half, said pawl members on each said mold half extending parallel to and spaced apart from one another, each said pawl member projecting beyond the centre line of said mold when said mold is in said closed position, said pawl members on said first mold half interdigitating with said pawl members on said second mold half in said closed position of said mold so as to extend over the entire length of said mold, each said pawl member defining a first internal throughbore and said first throughbores being aligned with one another in said closed position of said mold, each said pawl member on said first mold half defining a second internal throughbore, said second internal throughbores being aligned with one another in said closed state with said aligned first throughbores and said aligned second throughbores extending parallel to one another, said locking means further comprising locking member means disposed in each of said first throughbores, said locking member means comprising a plurality of end-abutting bar sections, each said section having a length corresponding to the length of a said first throughbore in a said pawl member, and means for longitudinally displacing said bar sections in said first throughbores wherein said displacement means comprise a continuous rod disposed in said aligned second throughbores and means connecting said continuous rod to both said outermost bar sections.

By providing displacement of the continuous shaft, in synchronism with displacement of the individual locking sections making up the actual locking member, which sections are disposed parallel to the continuous shaft and are guided in bores formed in the pawl member, the displacement need only be long enough to cause the individual locking members to move from their unlocked position in which they are each wholly located in one bore into a position where only half of the section is disposed in the bore of one pawl formed on one mold half and the other half is disposed in the bore of an adjacent, interdigitated, pawl formed on the other mold half. Despite this short locking movement, in which all of the individual locking sections are displaced, the mold halves are firmly locked along the entire length of the mold joint and both the locking and unlocking can be effected in a very short period of time.

Since the individual locking members have a length which corresponds to the length of the bore formed in the pawls, it will be readily appreciated that, in their unlocked state, the entire length of each locking section is accommodated wholly in a single bore without any protruberance therefrom, and the mold halves can therefore simply be pivoted away from one another.

The connection between the continuous shaft and the individual locking sections, which are disposed parallel thereto, is effected at both the upper and lower ends of the shaft. Effectively, therefore, a surrounding frame-like structure is provided and this means that the unlocking and locking procedure may be achieved by a very short lifting movement of the frame.

The connection between the shaft and the lowermost locking section is advantageously effected by means of a transverse bolt, and the connection between the shaft and the uppermost locking section is effected by means of a stop member which accommodates both the end of the shaft and the free end of the uppermost locking section.

The arrangement of the present invention therefore means that locking over the entire height of the mold can be achieved by a lifting movement of a few centimetres, even if the mold has a height of several metres.

BRIEF DESCRIPTION OF THE DRAWINGS

A preferred embodiment of the present invention will be further described, by way of example, with reference to the accompanying drawings, in which:-

FIG. 1 is a schematic view of an arrangement for the continuous stretching and blowing of plastics material bottles from preforms;

FIG. 2 is a schematic, side elevational view of a blowing station including a blow mold;

FIG. 5 is a cross-sectional view taken along the line V—V of FIG. 4 through the mold and locking apparatus and showing the mold in its unlocked state; and FIG. 6 is a cross-sectional view similar to that shown in FIG. 5 but showing the mold in its locked state.

DESCRIPTION OF PREFERRED EMBODIMENT

Figure 4:
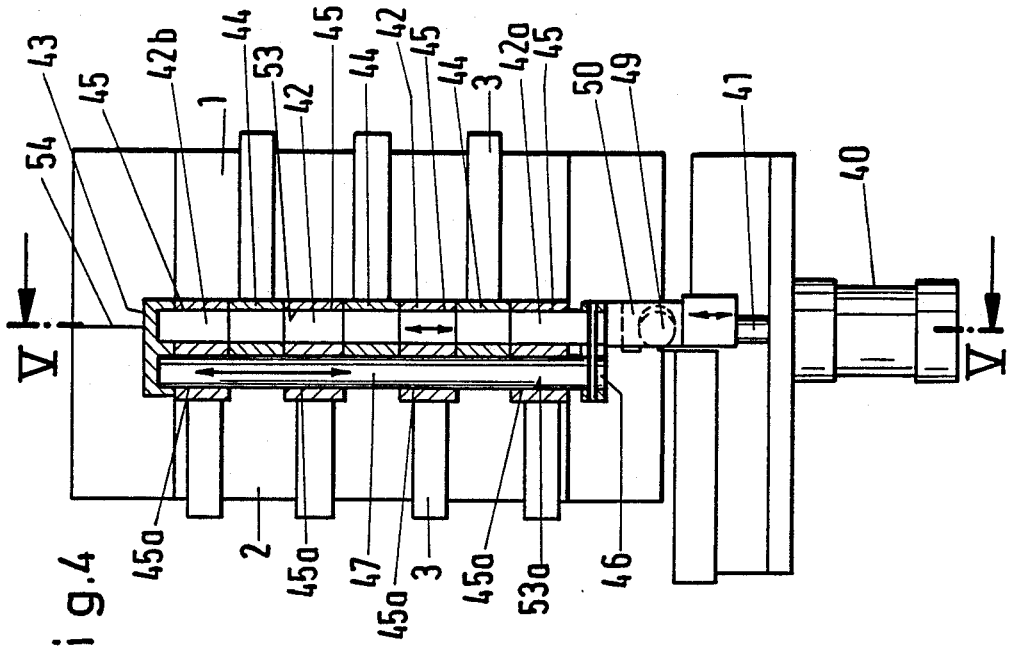
FIG. 4 is a front elevational view of an apparatus for locking the mold in its closed position.

Plastics material containers are produced by stretching and blow-molding preforms 55. The preforms 55 are produced in an injection molding machine, fed into a steeply angled conveyor and supplied to a sorting station. Thereafter, the preforms 55 are transferred to a heating station. After the heating process, the preforms pass to a blow wheel assembly 23 shown in FIG. 1. The assembly comprises four molds for effecting rapid longitudinal stretching and subsequent blowing of the heated preform 5.

On reaching the assembly 23, a preform 55 is collected in an open mold 24. The mold is then closed and the blow wheel is rotated through 90°. Accordingly, a new, opened mold is available to collect the new preform 55. As the wheel is rotated, stretching and blowing operations are effected on the preforms in stations 25 and 26 respectively. The mold is opened at station 27, and the finished container is supplied to a packaging machine (not shown) along a delivery path 28.

In FIG. 2, the mold 24 is shown in greater detail. From this figure, and from FIGS. 3 and 4, it will be seen that the mold comprises two mold halves 1 and 2 which are held by clamps 3. The clamps 3 are mounted on a shaft 4. The shaft 4 forms a pivotal axis for the opening and closing movements of the mold halves 1 and 2.

Figure 3:
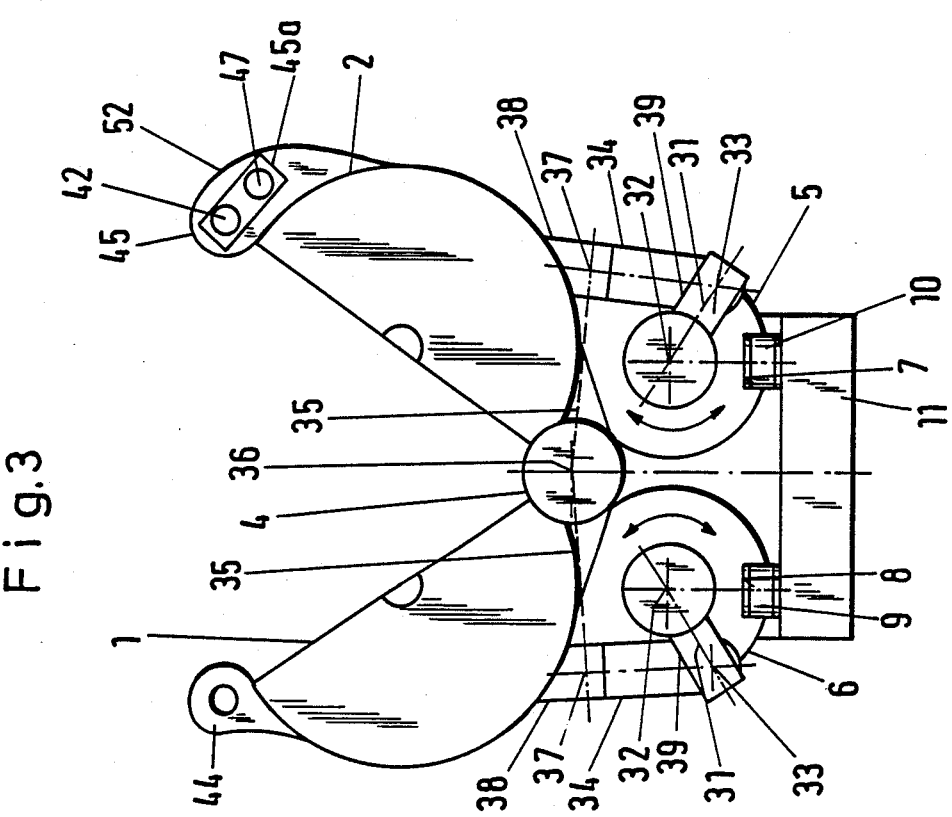
FIG. 3 is a plan view through the opened mold but with certain features not shown for the sake of clarity.

The mold halves are closed and opened by a four-link lever assembly which will now be described. Each mold half is connected to a guide arm member 38, which member is connected, at a pivot point 37, to one end region of a coupling member 34. The other end region of the coupling member 34 is connected, at a pivot point 33, to one end of guide means 39. The other end of the guide means 39 is connected to a cylinder 5 or 6. The cylinders 5 and 6 each define a cam track 7 and 8 respectively on their external curved surface. Rollers 10 and 9 respectively run in the tracks 7 and 8, which rollers are mounted on a sliding cam controller 11. When the mold halves are in the opened state, as shown in FIG. 3, the cam rollers 9 and 10 are in their upper position.

When the mold is closed and it is desired to open the mold halves, the sliding cam controller 11 is raised by hydraulic, pneumatic or mechanical means. The cam rollers 9 and 10 are thereby caused to move along the cam tracks 7 and 8 which causes rotation of the cam cylinders 5 and 6. In other words, the vertical movement of the sliding cam controller 11 is converted into rotational movement of the cam cylinders 5 and 6.

Such rotational movement of the cam cylinders 5 and 6 about their respective axes of rotation 32 is transmitted to the four-link lever assembly described hereinbefore by the cam gear assembly comprising the cam cylinders 5 and 6, the cam rollers 9 and 10 and the cylindrical cam tracks 7 and 8.

The four-link lever assembly is therefore in the form of a driving portion and a driven portion. The driving portion is in the form of a driving rocker arm 31 which comprises the guide means 39, one end of which is mounted on the pivot point 32 forming the axis of rotation of the cylindrical cam cylinders 5 and 6 and the coupling member 34 to which the other end of the arm 31 is pivotally connected at the pivot point 33.

The driven portion is in the form of a driven rocker arm 35 formed from the guide arm 38 pivotally connected at 37 to the coupling member 34 and the mold half 1 or 2 which is pivotable about a frame pivot point 36 and is secured thereto. In this case, the frame pivot point 36 is fixed and the pivot point 37 is floating.

In consequence, the opening and closing movements of the mold halves 1 and 2 are effected by means of a four-link lever assembly in combination with the cam gear assembly. An extremely short pivotal movement is achieved because the frame pivot point 36 is disposed immediately at the end of the mold joint between the mold halves 1 and 2.

The locking and unlocking of the mold halves when the mold is in its closed state is effected utilising a locking arrangement which will be described with reference to FIGS. 4 to 6. The locking arrangement comprises a hydraulic or pneumatic piston and cylinder arrangement 40. The piston rod 41 of the arrangement 40, when moved upwardly as shown in FIG. 4, engages with the underside of the lowermost locking section 42a of a series of end-abutting locking members 42 which are in the form of locking bars. The mold halves 1 and 2 are, as previously mentioned, provided with clamps 3. The clamps provided on one mold half, in this case, the mold half 1 each carry an end piece 44 and the clamps on the other mold half, in this case, the mold half 2, each carry an end piece 45. These end pieces 44 and 45 which are different from one another in a manner to be described hereinafter, interdigitate with one another when the mold is closed. The end pieces 44 and 45 each have a bore formed therein which, when the end pieces are interdigitated with one another, are aligned with one another and receive the locking members 42. The end pieces 45 also have a continuous shaft 47 extending therethrough. The shaft 47, which is connected to the lowermost locking member 42a in a frame-like manner by means of a transversely extending bolt 46. The shaft 47 is therefore also raised by the action of the piston rod 41. It should be noted that the shaft 47 does not pass through the end pieces 44 when the end pieces 44 and 45 are interdigitated. Moreover, each individual locking member 42 has a length corresponding to the thickness of each of the end pieces 44, 45. Finally, the upper end of the shaft 47 is fixedly connected to a stop member 43 in the form of a cap. A recess formed in the cap 43 receives the uppermost locking member 42.

When the piston rod 41 is moved upwardly, the individual locking members 42 are moved upwardly therewith into a position in which the entire length of each locking member is disposed within the thickness of one end piece and does not protrude therefrom as is shown in FIGS. 4 and 5. Accordingly, the interlocking between the mold halves 1 and 2 is released and the mold can be pivoted into its open position as shown in FIG. 3.

After the mold halves have been re-closed, the locking is effected by lowering the piston rod 41 of the piston and cylinder arrangement 40. This does not directly cause the lowering of the sections 42. However, the downward movement of the piston rod 41 is transmitted by the transverse bolt 46 to the shaft 47 and hence to the stop member or cap 43 secured to the upper end of the shaft 47. The downward movement of the stop member 43 forces the locking members 42 downwardly, ideally into a position in which one half of the length of each locking member is disposed in one of the end pieces 44 and the other half thereof is disposed in the adjacent end piece 45. This locks the interdigitated end pieces 44, 45 together and prevents the mold from being opened.

The locking of the mold halves 1 and 2 together in the closed position, which is necessary because of the high internal pressure prevailing in the mold, is effected along the entire length of the abutting edges of the mold halves. It is particularly emphasized that this locking necessitates only an extremely short movement path of the cylindrical locking members 42 between the locked and unlocked positions.

In consequence, the locking and unlocking of the mold halves relative to one another can be effected in a very short period of time, despite the fact that the locking extends over the entire height of the mold. There is, therefore, no need for a single long locking rod which would need to be displaced through a distance corresponding, at least, to the mold height.

In the present embodiment, for example, a piston stroke of the piston rod 41 of approximately 3 cm is sufficient to lock securely the halves of a mold having a height of approximately 90 cm from top to bottom. If it is remembered that a blow-molding machine may have an output of approximately 4,000 items per hour, such locking and unlocking of the mold halves is extremely important.

Since the mold halves 1 and 2 can be pivoted open about the pivot point 36 (shown in FIG. 3) after unlocking of the halves has taken place, a claw- or pawl-like connection is provided between the lower locking member 42, which is connected to the shaft 47 by the transverse bolt 46, and the piston rod 41. An angular member 48, is disposed on the locking member 42 and a pin 49 is connected to the piston rod 41 by means of an angular member 51. As the mold halves 1 and 2 pivot away from one another, the pawl 50 causes the angular member 48 to pivot away from the pin 49. It will be recalled that the locking members 42 and the continuous shaft 47 are disposed on the mold half 2, as shown in FIGS. 3 and 4, and are pivoted therewith. As the mold closes, the pawl 50 re-engages around the pin 49, so that, for the purpose of locking the mold halves relative to one another, this operation can be effected by means of a single stroke of the piston rod 41.

We claim:

1. A stretching and blowing apparatus for producing a hollow body from thermoplastic plastics material comprising a rotatable blow wheel assembly, a plurality of blow molds mounted on said wheel assembly, each said mold comprising first and second mold halves, common pivot means mounting both mold halves of each said mold to permit said mold halves to be pivoted into an open position and a closed position and locking means for locking said mold halves together in said closed position wherein said locking means comprises a plurality of pawl members formed on the external surface of each said mold half, said pawl members on each said mold half extending parallel to and spaced apart from one another, each said pawl member projecting beyond the centre line of said mold when said mold is in said closed position, said pawl members on said first mold half interdigitated with said pawl members on said second mold half in said closed position of said mold so as to extend over the entire length of said mold, each said pawl member defining a first internal throughbore and said first throughbores being aligned with one another in said closed position of said mold, each said pawl member on said first mold half defining a second internal throughbore, said second internal throughbores being aligned with one another in said closed state with said aligned first throughbores and said aligned second throughbores extending parallel to one another, said locking means further comprising locking member means disposed in each of said first throughbores, said locking member means comprising a plurality of end-abutting bar sections, each said section having a length corresponding to the length of a said first throughbore in a said pawl member, and means for longitudinally displacing said bar sections in said first throughbores wherein said displacement means comprise a continuous rod disposed in said aligned second throughbores and means connecting said continuous rod to both said outermost bar sections.

2. An apparatus as recited in claim 1, wherein said connecting means comprise a stop member fixedly connected to one end of said continuous rod for displacement therewith, said stop member receiving one said outermost bar section and transverse bolt means mounted on said rod and on said other outermost bar section.

3. An apparatus as recited in claim 1 additionally comprising drive means releasably connected to the lower of said two outermost bar sections, said drive means comprising a pneumatic piston and cylinder arrangement, said arrangement comprising piston rod means connected to said bar section and cylinder means slidably receiving said piston rod means.

4. An apparatus as recited in claim 3, additionally comprising a first angular member mounted on said lower outermost bar section and pawl means secured on said first angular member; a second angular member mounted on said piston rod and pin means mounted on said second angular member whereby engagement and disengagement of said pawl means with said pin means causes, respectively connection and disconnection of said lower outermost bar section to said piston rod.

5. An apparatus as recited in claim 1 additionally comprising drive means releaseably connected to the lower of said two outermost bar sections, said drive means comprising a hydraulic piston and cylinder arrangement, said arrangement comprising piston rod means connected to said bar section and cylinder means slidably receiving said piston rod means.

6. An apparatus as recited in claim 5, additionally comprising a first angular member mounted on said lower outermost bar section and pawl means secured on said first angular member; a second angular member mounted on said piston rod and pin means mounted on said second angular member whereby engagement and disengagement of said pawl means with said pin means causes, respectively, connection and disconnection of said lower outermost bar section to said piston rod.

* * * * *